United States Patent [19]

Ikeda

[11] 4,225,929
[45] Sep. 30, 1980

[54] CODE CONVERTER CIRCUITRY SYSTEM FOR SELECTIVELY ROTATING A VIDEO DISPLAY PICTURE

[75] Inventor: Yasuo Ikeda, Tokyo, Japan

[73] Assignee: Taito Corporation, Tokyo, Japan

[21] Appl. No.: 964,776

[22] Filed: Nov. 29, 1978

[30] Foreign Application Priority Data

Mar. 10, 1978 [JP] Japan .................................. 53-27913

[51] Int. Cl.³ ............................................. G06F 3/14
[52] U.S. Cl. .................................. 364/521; 340/727; 340/801; 364/515
[58] Field of Search ....................... 364/410, 515, 521; 340/718, 727, 798-801

[56] References Cited

U.S. PATENT DOCUMENTS

| | | | |
|---|---|---|---|
| 3,821,729 | 6/1974 | Schultze | 340/727 |
| 3,976,982 | 8/1976 | Eiselen | 340/727 X |
| 4,116,444 | 9/1978 | Mayer et al. | 364/521 X |
| 4,146,925 | 3/1979 | Green et al. | 364/521 |

Primary Examiner—Jerry Smith
Attorney, Agent, or Firm—William D. Hall

[57] ABSTRACT

A code conversion circuit especially suited for, but not limited to, use with a video display apparatus of a type in which the screen is arbitrarily divided into plural domains defined by horizontal scan lines, $X_i$, and vertical section lines, $Y_j$. A random access memory (RAM) used in the system stores local codes defining the video symbols to be displayed in the various domains on the screen. The code conversion circuit permits selective modification of the addresses applied to the RAM so that a picture element normally displayed in domain $X_i$ $Y_j$ can, in turn, be displayed in a domain $X_m Y_n$. Means are further provided for inverting the order in which the local codes read from the RAM are applied to the video display. Hence, the code conversion circuit is capable of rotating an image to be displayed about the center point of the display screen.

11 Claims, 2 Drawing Figures

CODE CONVERTER CIRCUITRY SYSTEM FOR SELECTIVELY ROTATING A VIDEO DISPLAY PICTURE

BACKGROUND OF THE INVENTION

I. Field of the Invention:

This invention relates generally to a code converting system and more specifically to an electronic, digital system particularly adapted for use in video display apparatus for selectively changing the location on the screen where graphic information is to be displayed.

II. Description of the Prior Art:

So-called video games have become highly popular in the recent past. In such machines, video signals are usually formed by synthesizing program-information which is recorded in a read-only memory along with information which is generated by the players as well as other information which may be required.

In a video game machine, especially wherein the video screen is disposed in a generally horizontal orientation such as on a table top, it is often required that the display be inverted so that players on opposite sides of the table may be provided with an identical display as far as its orientation on the screen is concerned. For exemplary purposes only, consider the situation of a baseball game. When the screen is disposed in a vertical orientation, and each player is facing the screen, each simultaneously perceives the same display of the field. However, when the screen is disposed in a horizontal orientation, as in a table top, and the players are seated on opposite sides of the table one will be observing the game from the outfield towards home plate whereas the other player will be viewing it from home base toward the outfield. As they play the game, they will be repeating the interchanges of batting and fielding and, hence, it is desirable that the video presentation be inverted as the players change from a batting mode to a fielding mode.

One prior art approach at providing this desired inversion of the video presentation has involved the use of two separate memories having recorded contents symmetric with respect to one another. As the mode of play is to be reversed, the contents of the first memory are read into the second and the contents of the second memory are read into the first. This requires an inordinate amount of circuitry and associated programming.

SUMMARY OF THE INVENTION

The present invention is deemed to be an improvement over the prior art in that it materially simplifies the circuitry required to achieve display inversion.

In accordance with the present invention, a code converter is provided which includes a first address register which receives successive addresses according to a predetermined first addressing sequence, an addressing sequence rearranging circuit and a second address register, the rearranging circuit being disposed between the output of the first address register and the input of the second address register. The system further includes a change-over circuit which is coupled to the address rearranging circuit such that the addresses entered into the second address register may be definitive of either a first or a second operating state for the system. The output from the second address register is used to access a random access memory in which is stored at addressable locations therein binary signals comprising local codes which define the video information to be displayed at a given domain on the face of the display screen. This data includes information which has been previously recorded in a read-only memory (ROM) (not shown), information which may be generated in response to players' operations, information which may be created by, for example, a microprocessor (not shown) on the basis of the previously recorded or operator generated information.

The system further includes first and second local code registers which receive the local codes from the RAM and which, under control of the changeover circuit, feed the video system with the local codes in a first order or in a second order which is reversed from the first order.

OBJECTS

It is accordingly the principal object of the present invention to provide a new and improved code converter for use with electronic graphic display systems.

Another object of the invention is to provide a code converter which can function to selectively alter addresses presented to a memory device so that prestored information contained in the memory can be accessed in accordance with a first or a second mode.

Still a further object of the invention is to provide a code generator for use with a cathode ray tube type graphic display system for allowing a given pattern displayed on the screen to be effectively rotated 180°.

A still further object of the invention is to provide a code converter which is able to change, upon command, into a first operating state wherein local codes of a first mode are recorded in a random access memory so as to be successively read out according to a predetermined first addressing sequence into a second operating state wherein the local codes of the first mode are converted into those of a second mode so as to be successively read out from the memory in a second addressing sequence different from the first addressing sequence and vise versa.

These and other objects and advantages of the invention will become apparent to those skilled in the art from the following detailed description of the preferred embodiment when considered in conjunction with the accompanying drawings.

DETAILED DESCRIPTION OF THE PREFERRED EMBODIMENT

Hereunder, an embodiment of this invention will be described with reference to the drawings.

Figure 1:
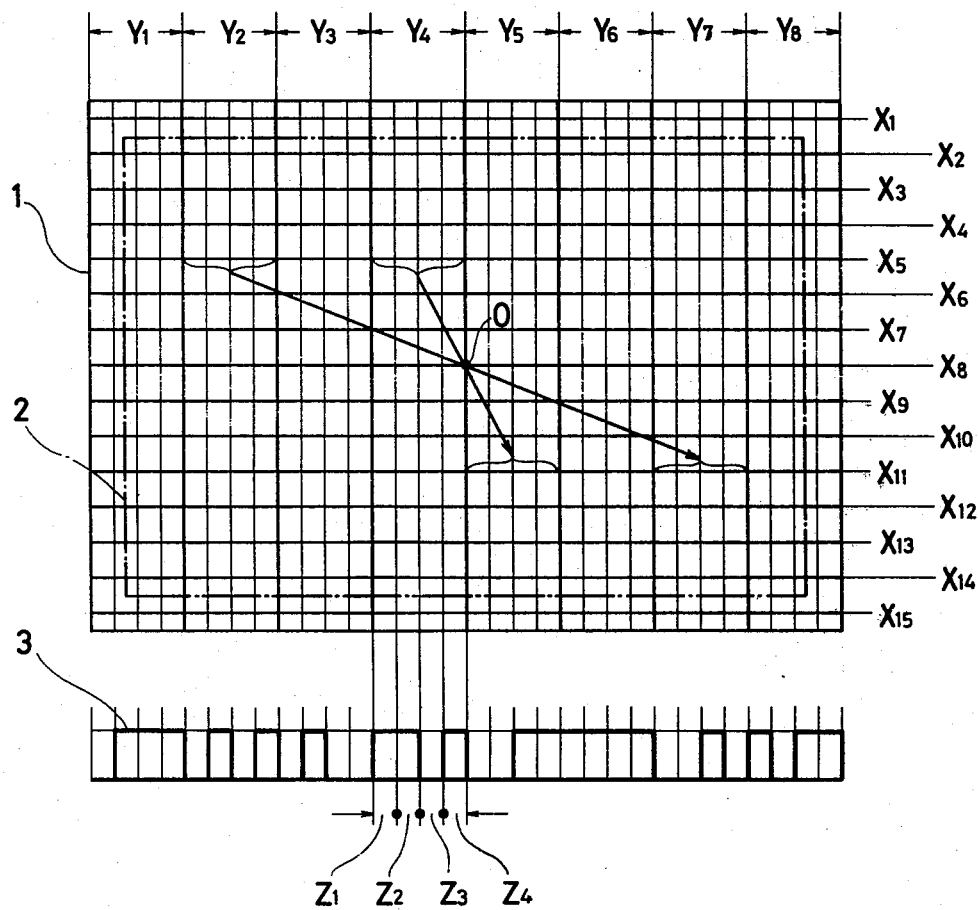
FIG. 1 is a domain map of a television screen or the like useful in explaining the method of encoding picture elements on the screen.

In FIG. 1, numeral 1 designates a part of the screen of a cathode ray tube, numeral 2 an effective picture frame, and numeral 3 a pulse pattern showing an example of picture element signals which are included in a single scanning line.

In this Figure, in order to simplify the explanation, the number of scanning line is made fifteen, and the number of picture elements on each scanning line is made thirty-two.

That is, in the illustration of the Figure, fifteen scanning lines $X_1$ to $X_{15}$ are drawn, and the screen is divided into eight sections $Y_1$ to $Y_8$ in the lateral direction. Further, one set of picture element signals of four bits $Z_1$, $Z_2$, $Z_3$ and $Z_4$ is contained in an arbitrary domain $X_iY_j$ which is specified by scanning line No. $X_i$ and section No. $Y_j$.

In a television game machine in which the present invention finds application, the picture element signals consist of those which are generated in accordance with a program or rules given in advance, those which are generated in response to game operations by players, etc. Ordinarily, they are stored in an appropriate memory, are fetched from the memory in synchronism with a vertical synchronizing signal and a horizontal synchronizing signal necessary for constructing a television picture frame, and are composed as video signals.

The apparatus of the present embodiment aims at rotating the television picture by 180° about its central point 0 upon occasion and thus changing it over to a picture frame inverted in the vertical and horizontal directions.

To this end, it is necessary that the picture element signals belonging to e.g. the domains $X_5 Y_2$ and $X_5 Y_4$ are respectively shifted to the domains $X_{11} Y_7$ and $X_{11} Y_5$ and that the order of the picture element signal $Z_1 Z_2 Z_3 Z_4$ having been within each domain is simultaneously inverted to rearrange it into the sequence of $Z_4 Z_3 Z_2 Z_1$.

As mentioned earlier, the prior art approach is to change all the records of the memory or to utilize two memories having recorded contents symmetric with each other. Both of these measures, however, require expensive and complicated circuits.

Before describing the details of the invention, special terms used in the present specification will be defined.

(1) First operating state and second operating state:
When an erect figure appears on the television screen, the circuit shall be defined as being in the "first operating state." When an inverted figure appears, the circuit shall be defined as being in the "second operating state."

(2) Scanning line Nos.:
Numbers given to scanning lines. Ordinarily, they are assigned in the sequence in which the scanning lines manifest themselves after a vertical fly-back period.

(3) Sections:
The "sections" are obtained by dividing the television screen at equal intervals in the horizontal or lateral direction.

(4) Section Nos.:
Numbers successively assigned to the respective sections from the starting point of a scanning line towards the end point thereof.

(5) Domains:
Each "domain" shall be a divided area on the television screen as bounded by adjacent scanning lines and adjacent section lines.

(6) Local codes:
Encoded picture element signals which are given to the respective domains in order to produce desired patterns therein.

(7) Modes of local codes:
The local codes which are read out from storage when the circuit is in the first operating state shall be of the "first mode", while the local codes which are read out from storage when the circuit is in the second operating state shall be of the "second mode".

(8) Addresses:
Locations of the local codes of the respective domains within a memory in which the local codes of all the domains are recorded.

(9) Addressing codes:
Codes representative of the addresses.

(10) Addressing sequence:
Sequence of selecting the addresses in the case of fetching the local codes of the respective domains from the memory in synchronism with the scanning.

In the first operating state, there is employed an "address order" which corresponds to the order of domains successively appearing from the starting point towards the end point of the scanning within one frame, that is to say, the "first addressing sequence".

In the second operating state, there is employed an "addressing sequence" which corresponds to the order of domains inverse to the above, that is, the "second addressing sequence".

Using the definitions, FIG. 1 will now be explained. The scanning lines are respectively given a number according to the scanning sequence. The screen is divided into eight sections in the horizontal direction, and the respective sections are arbitrarily assigned a number successively from the left to the right.

The television screen is divided into domains assigned by the scanning line numbers and the section numbers, and the respective domains are given local codes.

All the local codes are recorded in the memory, and when the circuit is in the first operating state, they are successively fetched in the first mode according to the first addressing sequence in synchronism with the synchronizing signals, so that an erect figure appears on the television screen. When the circuit is in the second operating state, they are successively fetched in the second mode according to the second addressing sequence, so that an inverted figure appears on the television screen.

The construction and mode of operation of the preferred embodiment will now be explained with reference to FIG. 2.

Figure 2:
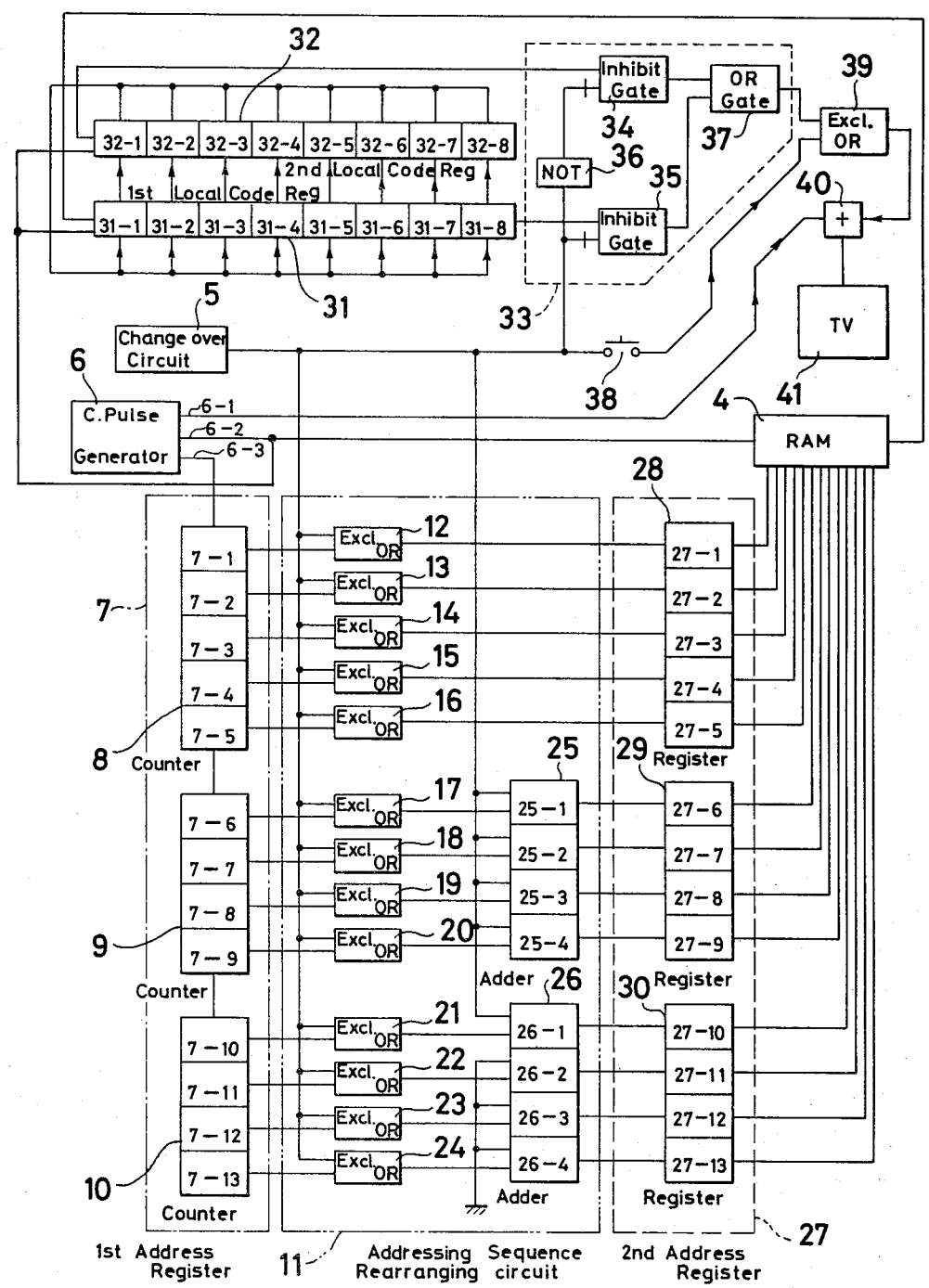
FIG. 2 is a circuit diagram showing the construction of the preferred embodiment of the code converting circuitry system of the present invention.

In FIG. 2, numeral 4 identifies a random access memory (RAM) in which all of the local codes are recorded at addressable locations. Numeral 5 designates a changeover circuit, which, in its simplest form, may comprise a flip-flop which may be automatically or manually set or cleared.

Numeral 6 identifies a clock pulse generator which is a square wave oscillator capable of producing output pulses at a fixed and prescribed rate.

Numeral 7 designates a first address register which consists of three counters, 8, 9 and 10, respectively. In the exemplary embodiment shown, counter 8 is comprised of five stages 7-1 through 7-5 respectively, and which is adapted to be incremented by clock pulses appearing on conductor 6-3. The output from counter 8 is coupled as an input to the counter 9 which includes four stage, 7-6 through 7-9. Similarly, the output from counter 9 feeds the counter 10 which is also four stages in length, namely, stages 7-10 through 7-13.

Enclosed by broken line box 11 is an addressing sequence rearranging circuit which includes a plurality of exclusive OR circuits 12 through 24, each having a first input coupled to the output of the changeover circuit 5 and a second input coming from an individual stage of the first address register 7. Also included in the address order rearranging circuit 11 are a pair of binary adders 25 and 26. Stages 25-1 through 25-4 and 26-1 have a first input coupled to the output of the changeover circuit 5. The other inputs to these stages come from the exclusive OR gates 17-21, respectively. It is to be noted that stages 26-2 through 26-4 of the adder 26 have a first input coupled directly to a point of fixed potential so as to continually have a binary "0" level signal applied thereto. The second inputs to the adder stages 26-2 through 26-4 come from an associated exclusive OR circuit 22, 23 or 24.

The system further includes a second address register 27 which is also comprised of a plurality of binary counters 28, 29 and 30. Counter 28 includes five stages, namely, stages 27-1 through 27-5 which are coupled directly to the output of the exclusive OR circuits 12-16 of the address order rearranging circuit 11. Counters 29 and 30 have their individual stages 27-6 through 27-9 and 27-10 through 27-13 coupled directly to the output stages of the adders 25 and 26.

The outputs from the second address register 27 are applied as address inputs to the RAM 4 and are used to access specified domains under control of clock pulses applied thereto by way of conductor 6-2.

The system further includes a first local code register 31 which may comprise a serial shift register having stages 31-1 through 31-8, the output from the RAM 4 being connected to the lowest order stage 31-1 of this shift register. The individual stages of the shift register 31 are also applied to a second local code register 32. It is to be noted that because of the manner in which the first and second local code registers 31 and 32 are intercoupled, one with the other, that the order in which the bits stored in these registers are read out can be reversed.

Enclosed by broken line box 33 is a data selector consisting of inhibit gates 34 and 35, an inverter 36 and an OR gate 37. The direct output from the changeover circuit 5 is connected to the inhibit input of gate 35 whereas the complement of this signal is applied to the inhibit gate 34 by way of the inverter 36. Thus, depending upon the binary state of the output from the changeover circuit 5, either the output from the first local code register 31 or that from the second local code register 32 will be transmitted through its respective gate to the OR gate 37.

The output from the OR gate 37 is applied to a first input of an exclusive OR gate 39 whose second input may be selectively coupled to the changeover circuit 5 by way of the switch 38. The output of the exclusive OR gate 39 is transmitted along with clock pulses from the clock pulse generator 6 to a video signal compiler 40 where they are combined with vertical sinc pulses and horizontal sinc pulses to form a desired video signal. This video signal is sent to the cathode ray tube display 41.

While in a practical embodiment of the invention, the number of scanning lines $X_i$, the number of sections $Y_j$ and the number of picture elements per domain are greater than those illustrated in FIG. 1, for ease of understanding, a more limited number have been shown on this drawing. In this regard, the embodiment will be described with the assumption that the number of scanning lines employed is in the range of from 129 to 256, that the number of sections is $2^5 = 32$ and that the number of picture elements per domain is $2^3 = 8$.

In the RAM 4, there are recorded all the picture element signals which are necessary for producing a desired picture on the TV receiver 41. The data include information which have been recorded in a ROM (not shown) in advance, information which are generated in response to player's operations, information which are created by e.g. a microprocessor (not shown) on the basis of the said recorded or generated information, etc.

The clock pulse generator 6 has output terminal 6-1 for vertical and horizontal synchronizing pulses for video signals, output terminal 6-2 for shift pulses for driving the local code registers 31 and 32 and RAM 4, and output terminal 6-3 for clock pulses for driving the first address register 7.

The counter 8 is a binary counter of 5 bits. It is driven by the pulses provided from the output terminal 6-3 of the clock pulse generator 6, and it indicates section Nos. $[Y_j]$ of from 1 to 32. Both the counters 9 and 10 are binary counters of 4 bits. They form upper-digit counters of the counter 8, and indicate scanning line Nos. $[X_i]$.

Accordingly, domain numbers are indicated as a series of binary numerical values $[X_i Y_j]$ by these counters. The binary number $[X_i Y_j]$ indicates the address in the RAM 4, of the local code representative of the picture element to be displayed in the domain $[X_i Y_j]$ when the circuit is in the first operating state.

The changeover circuit 5 determines whether the whole circuit is put into the first operating state or the second operating state with the proceeding of a game. Its output becomes the state "0" when the circuit is to be put into the first operating state, and becomes the state "1" otherwise.

One input of each of the exclusive OR gate 12 to 24 is the output of the changeover circuit 5, while the other input is an output which indicates the state of the corresponding one of bits 7-1 to 7-13 in the first address register 7. Therefore, when the output of the changeover circuit 5 is the state "0", the outputs of the exclusive OR gate coincide with the states of the respective bits of the first address register 7. Otherwise, the outputs of the exclusive OR gate become the opposite of the states of the respective bits of the first address register 7.

The outputs of the exclusive OR gate 12 to 16 are directly recorded by the register 28 as they are. The outputs of those 17 to 20 and those 21 to 24 are recorded by the registers 29 and 30 through the adders 25 and 26, respectively. The outputs of the exclusive OR gate 17 to 20 and 21 to 24 are respectively entered into the bits 25-1 to 25-4 of the adder 25 and the bits 26-1 to 26-4 of the adder 26. In addition, the output of the changeover circuit 5 is entered into the bits 25-1 to 25-4 and 26-1.

Accordingly, when the output of the changeover circuit 5 is the state "0", the inputs and outputs of the adders 25 and 26 are identical. Otherwise, the adders 25 and 26 provide codes which correspond to numerical values with a binary number [00011111] added to binary numbers of 8 bits that are indicated by input values thereof.

The explanation of the operation of the addressing sequence rearranging circuit 11 becomes extremely complicated when the number of scanning lines and the number of sections are large. For the sake of brevity, FIG. 1 will be referred to again.

In this case, the scanning line numbers are expressed by binary numbers of 4 bits $[X_i]$, and the section numbers by binary numbers of 3 bits $[Y_j]$.

Here, the following is assumed:

$$[X_i] = [X_{i1}\ X_{i2}\ X_{i3}\ X_{i4}]$$

$$[Y_j] = [Y_{j1}\ Y_{j2}\ Y_{j3}]$$

Then, when the circuit is in the first operating state, the address $[A_1]$ of the local code which represents the picture element to be displayed in e.g. the domain $[X_i\ Y_j]$ is a binary number of 7 bits:

$$[A_1] = [X_i\ Y_j]$$
$$= [X_{i1}\ X_{i2}\ X_{i3}\ X_{i4}\ Y_{j1}\ Y_{j2}\ Y_{j3}]$$

However, when the circuit is changed over to the second operating state, the address of the local code representative of the picture element to be displayed in the domain $[X_i\ Y_j]$ becomes $[A_2]$. Letting $[A_2]$ be $$[A_2] = [X_m\ Y_n]$$
$$= [X_{m1}\ X_{m2}\ X_{m3}\ X_{m4}\ Y_{n1}\ Y_{n2}\ Y_{n3}]$$

it becomes clear that $[X_i]$ and $[X_m]$, and $[Y_j]$ and $[Y_n]$ may be respectively related as follows:

$$[X_m] = [X_i] + [K_4]$$

$$[Y_n] = [Y_j] + [K_3]$$

where $[K_4]$ and $[K_3]$ are constants which are determined by the numbers of the scanning lines and the sections and the way of code-allotment to them.

This will be readily understood from numerical values listed in Table 1 and Table 2.

TABLE 1

| Scanning line | $X_i$ | $\overline{X_i}$ | $\overline{X_i} + K_4 = X_m$ |
|---|---|---|---|
| $X_1$ | 0000 | 1111 | 1110 |
| $X_2$ | 0001 | 1110 | 1101 |
| $X_3$ | 0010 | 1101 | 1100 |
| $X_4$ | 0011 | 1100 | 1011 |
| $X_5$ | 0100 | 1011 | 1010 |
| $X_6$ | 0101 | 1010 | 1001 |
| $X_7$ | 0110 | 1001 | 1000 |
| $X_8$ | 0111 | 1000 | 0111 |
| $X_9$ | 1000 | 0111 | 0110 |
| $X_{10}$ | 1001 | 0110 | 0101 |
| $X_{11}$ | 1010 | 0101 | 0100 |
| $X_{12}$ | 1011 | 0100 | 0011 |
| $X_{13}$ | 1100 | 0011 | 0010 |
| $X_{14}$ | 1101 | 0010 | 0001 |
| $X_{15}$ | 1110 | 0001 | 0000 |

In Table 1, decimal numbers (i−1) as binary coded are given as the codes $[X_i]$ representative of the scanning lines $X_i$. In this case, $$[X_m] = [\overline{X_i}] + [1111]$$

However, when the codes of the scanning lines $X_i$ are made decimal numbers i as binary coded, $$[X_m] = [\overline{X_i}] + [0001]$$

TABLE 2

| Section | $[Y_j]$ | $[\overline{Y_j}] = [Y_n]$ |
|---|---|---|
| $Y_1$ | 000 | 111 |
| $Y_2$ | 001 | 110 |
| $Y_3$ | 010 | 101 |
| $Y_4$ | 011 | 100 |
| $Y_5$ | 100 | 011 |
| $Y_6$ | 101 | 010 |
| $Y_7$ | 110 | 001 |
| $Y_8$ | 111 | 000 |

In case of Table 2, $[K_3] = 0$.

Let's refer to FIG. 2 again. The exclusive OR gate 12 to 16 are circuits which carry out the conversion indicated in Table 2, $$[Y_n] = [\overline{Y_j}]$$

when the code converter circuit is put into the second working state.

In this case, the number of sections is $2^5 = 32$. It will be easily understood that the conversion is possible with the circuits by giving the sections $Y_i$ the binary number codes corresponding to the decimal numbers (i-1).

Likewise, the circuit which consists of the exclusive OR gate 17 to 24 and the adders 25 and 26 carries out the conversion, $$[X_m] = [\overline{X_i}] + [00011111]$$

in the second operating state.

When the changeover circuit 5 is in its "1" state, a binary "1" signal is applied as a first input to each of the Exclusive OR circuits 12 through 24 and, as such, the complement of the contents of the first address register 7 is produced at the output of these Exclusive OR circuits. In that the outputs of Exclusive OR gates 12 through 16 are tied directly to the inputs of stages 27-1 through 27-5 of the second register, the complement value of the address bits in stages 7-1 through 7-5 of register 7, i.e., $[\overline{Y_j}]$ are transferred to counter 28 of register 27 when the changeover circuit 5 is in its "1" state.

The outputs from the Exclusive OR stages 17 through 24, however, are applied to adder stages 25-1 through 25-4 and 26-1 through 26-4. Again, assuming that changeover circuit 5 is in its "1" state, a binary code "1" will be added to the complement values applied to the stages 25-1 through 25-4 and stage 26-1. In that the second inputs to adder stages 26-2 through 26-4 are tied to ground, they will carry a binary "0" signal. It can be seen, then, that the constant, $K_4$, (00011111) will be added to the complement of the scanning line numbers $[X_i]$, that is, $[\overline{X_i}]$ to yield $[X_m]$.

It can be seen, then, that the address loaded into the second address register 27 is in accordance with a first addressing sequence when the system is in a first operating state, and that it receives a second addressing sequence when the system is in a second operating state. As such, the RAM 4 is accessed according to either a first or a second addressing sequence depending upon the state of the changeover circuit 5.

In either event, the local codes stored in the RAM 4 which are addressed by the contents of the second address register 27 are read out into the first and second local code registers 31 and 32.

As mentioned earlier, the first and second local code registers 31 and 32 are shift registers, which serially provide the local codes in synchronism with the high-frequency clock pulses that are delivered from the output terminal 6-2 of the clock pulse generator 6. Because of the manner in which the local code registers 31 and 32 are wired together and the order in which the inputs and outputs are obtained therefrom, one register is operative to provide the local code information in a first sequence while the other register provides it in a second sequence.

More specifically, both registers 31 and 32 record the local codes [$Z_1 Z_2 Z_3 Z_4 Z_5 Z_6 Z_7 Z_8$]. However, the outputs from the local code register 31 are the local codes of the first mode, i.e., $Z_1 Z_2 \ldots Z_8$, whereas the outputs from the local code register 32 are of the second mode, i.e., $Z_8 Z_7 \ldots Z_1$.

It is the data selector 33 which is operative to determine which sequence will be applied to the video signal compiler 40. This too depends upon the output state of the changeover circuit 5. It can be seen that when the changeover circuit 5 is producing a first output (binary "0") inhibit gate 35 will be enabled while inhibit gate 34 is disabled. As a result, the sequence $Z_1 Z_2 \ldots Z_8$ is fed through the inhibit gate 35, the OR gate 37 and the Exclusive OR gate 39 to the video compiler 40. However, when the changeover circuit 5 is in its binary "1" state, gate 35 will be inhibited whereas gate 34 will be enabled. As such, the sequence $Z_8 Z_7 \ldots Z_1$ will be fed through the OR gate 37 and the Exclusive OR gate 39 to the video compiler 40.

The Exclusive OR gate 39 is operative to invert black and white of the image displayed. By keeping the manual switch 38 closed, the black and white of the picture are inverted when the code converter is functioning in its second operating state.

It can be seen, then, that each time the changeover circuit 5 is switched to invert the output thereof, the picture provided on the display screen of the receiver 41 is subjected to a 180° inversion. When the switch 38 is held closed, the picture is simultaneously subjected to the black-and-white inversion. The need for two memories storing respectively a direct image and an inverted image is obviated. Relatively simple, low cost and readily available digital logic is utilized throughout.

While there has been shown and described the preferred embodiment of the invention, it should be understood that various changes and modifications will become apparent to those skilled in the art from a reading of the present specification. For example, it can readily be seen how the invention can be utilized to achieve the desired 180° inversion of only a portion of the CRT display rather than its entirety. It should also be apparent that the invention can be applied to various other known display devices, other than of the CRT type and possibly for other uses. Accordingly, the scope of the invention is to be determined from the following claims.

I claim:

1. A code converter comprising in combination:
   (a) memory means for storing data signals at addressable locations therein;
   (b) a first address register for at least temporarily storing address representing signals;
   (c) a second address register having the output thereof coupled to said memory means;
   (d) control means;
   (e) an address rearranging circuit controlled by said control means and disposed between said first address register and said second address register for selectively transferring said address representing signals or a predetermined modification of said address representing signals to said second address register, said second address register being coupled to said memory means for selecting the data signals read out from said memory means; and
   (f) local code register means connected to the output of said memory means and to said control means for receiving the data signals read out from memory means and selectively supplying said data signals in a first order or a second order.

2. Apparatus as in claim 1 wherein said address rearranging circuit comprises:
   (a) a plurality of Exclusive OR gates, each having a first input connected to the output of said control means and a second input connected to the output of an individual stage of said first address register;
   (b) means coupling the output of predetermined ones of said plurality of Exclusive OR gates to the input of predetermined stages of said second address register;
   (c) a plurality of binary adder circuits having a first input coupled to the output of other predetermined ones of said plurality of Exclusive OR gates, and a second input coupled to said control means; and
   (d) means coupling the output of said binary adder circuits to other predetermined stages of said second address register.

3. Apparatus as in claim 1 wherein said local code register means comprises:
   (a) a first multistage shift register having the input to its lowest order stage connected to the output of said memory means;
   (b) a second multistage shift register having the input to individual stages thereof coupled to the output of a corresponding stage of said first shift register and the output of individual stages thereof coupled to the inputs of corresponding stages of said first shift register; and
   (c) data selector means controlled by said control means for receiving the output of the highest order stage of said first shift register and the output of the lowest order stage of said second shift register.

4. Apparatus as in claim 3 and further including:
   (a) a cathode ray tube display device coupled to said data selector means.

5. Apparatus as in claim 4 wherein said cathode ray tube display device has a screen arbitrarily divided into a plurality of rectangular domains defined by horizontal scanning lines, $X_i$, and vertical section lines, $Y_j$, and wherein said memory means stores local codes representative of images to display in each of said plurality of domains.

6. Apparatus as in claim 5 wherein said address representing signal stored in first predetermined stages of said first address register define said section lines, $Y_j$, and the address representing signals in second predetermined stages of said first address register define said scanning lines, $X_i$.

7. Apparatus as in claim 6 wherein said address rearranging circuit receives said address representing signals from said first address register to form the signal set [$X_m$] and [$Y_n$] where [$X_m$]=[$\overline{X}_i$]+[$K_4$] and [$Y_n$]=[$Y_j$]+[$K_3$] prior to transmission to said second address register.

8. Apparatus as in claim 7 wherein [$K_4$]=$(00011111)_2$ and [$K_3$]=0.

9. A code converting circuitry system for changing a first operating state wherein local codes of a first mode determined in correspondence with addressing codes and recorded in a memory are successively read out according to a first predetermined addressing sequence into a second operating state wherein local codes of the first mode are converted into local codes of a second mode according to a predetermined conversion rule and said local codes of the second mode are successively read out according to a second addressing sequence different from said first addressing sequence, comprising:

(a) a changeover circuit for determining said first or second operating state;

(b) a first address register which assigns addresses successively in said first addressing sequence;

(c) an addressing sequence rearranging circuit controlled by said changeover circuit for transmitting the contents of said first address register without change or in a changed condition wherein said addressing codes are in said second addressing sequence;

(d) a second address register for temporarily storing the output of said addressing sequence rearranging circuit;

(e) a first local code register in which the local codes of said memory corresponding to the addresses indicated by said second address register are recorded and provided with an output to which the recorded local codes are supplied in the first mode;

(f) a second local code register in which said local codes of said memory corresponding to the addresses indicated by said second address register are recorded and provided with an output to which the recorded local codes are supplied in the second mode; and (g) a data selector coupled to the output of said first and second local code registers for selecting and delivering the recorded codes of either said first or second local code register in response to the output of said changeover circuit.

10. A code converting circuit as defined in claim 9, wherein said addressing sequence rearranging circuit is comprised of Exclusive OR gates which are disposed at respective bit stages of said first address register and which receive signals representative of states of the corresponding bits and the output from said changeover circuit.

11. A code converting circuit as in claim 9 wherein said addressing sequence rearranging circuit is comprised of Exclusive OR gates which are disposed at respective bit stages of said first address register and which receive signals representative of states of the corresponding bits and the output of said changeover circuit, and includes (a) adder means which receive outputs of said Exclusive OR gates and which add a desired constant thereto in response to the output of said changeover circuit or transfer them unaltered to said second address register.

* * * * *